(12) United States Patent
Alkhalaf et al.

(10) Patent No.: US 11,535,557 B2
(45) Date of Patent: Dec. 27, 2022

(54) LIGNOSULFONATE AND HYDROLYZED CARBOHYDRATE RETARDER ADDITIVE FOR CEMENT MIXTURE

(71) Applicant: SAUDI ARABIAN OIL COMPANY, Dhahran (SA)

(72) Inventors: Sara Abdulaziz Alkhalaf, Alkhobar (SA); Abdullah Al-Yami, Dhahran (SA); Vikrant Wagle, Dhahran (SA); Ali Alsafran, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/231,569

(22) Filed: Apr. 15, 2021

(65) Prior Publication Data
US 2022/0332644 A1    Oct. 20, 2022

(51) Int. Cl.
| | |
|---|---|
| C04B 24/18 | (2006.01) |
| C04B 24/10 | (2006.01) |
| C04B 7/02 | (2006.01) |
| C09K 8/467 | (2006.01) |
| C04B 103/24 | (2006.01) |

(52) U.S. Cl.
CPC ............... *C04B 24/18* (2013.01); *C04B 7/02* (2013.01); *C04B 24/10* (2013.01); *C09K 8/467* (2013.01); *C04B 2103/24* (2013.01)

(58) Field of Classification Search
CPC .......... C04B 7/02; C04B 24/10; C04B 24/18; C04B 2103/24; C09K 8/467
See application file for complete search history.

(56) References Cited

U.S. PATENT DOCUMENTS

| | | | |
|---|---|---|---|
| 3,668,123 A | 6/1972 | Steinberg et al. | |
| 3,753,748 A | 8/1973 | Martin | |
| 4,351,671 A | 9/1982 | Rosenberg et al. | |
| 4,504,317 A | 3/1985 | Smeltzer et al. | |
| 4,946,506 A * | 8/1990 | Arfaei ................. | C04B 24/2647 106/725 |
| 5,370,181 A | 12/1994 | Nahm et al. | |
| 5,503,672 A | 4/1996 | Barlet-Gouedard et al. | |
| 6,558,461 B2 * | 5/2003 | Lebo, Jr. ................. | C04B 24/24 106/725 |
| 6,907,928 B2 | 6/2005 | Di Lullo Arias et al. | |
| 7,462,236 B2 | 12/2008 | Chun et al. | |
| 8,550,162 B2 | 10/2013 | Michaux et al. | |
| 8,551,240 B2 | 10/2013 | Michaux et al. | |
| 9,410,072 B2 | 8/2016 | Scoggins | |
| 9,688,577 B2 | 6/2017 | Burge et al. | |
| 9,932,269 B2 | 4/2018 | Zubrod | |
| 9,975,807 B2 | 5/2018 | Michaux et al. | |
| 10,196,310 B2 | 2/2019 | Zubrod et al. | |
| 10,266,746 B1 * | 4/2019 | Rahman ................. | C04B 28/02 |
| 2014/0187680 A1 | 7/2014 | Kripavicius | |
| 2017/0190946 A1 | 7/2017 | Pearl, Jr. et al. | |

FOREIGN PATENT DOCUMENTS

| | | | |
|---|---|---|---|
| CN | 106145743 A | | 11/2016 |
| CN | 104650836 B | | 2/2018 |
| CN | 111620633 A | * | 9/2020 |
| EP | 2709964 B1 | | 7/2019 |
| WO | 2001036344 A2 | | 5/2001 |
| WO | 2019086489 A1 | | 5/2019 |

OTHER PUBLICATIONS

Tong, Su et al., "Recent advances in chemical admixtures for improving the workability of alkali-activated slag-based material systems", Construction and Building Materials, ScienceDirect, Elsevier Ltd., 2020, URL: <https://doi.org/10.1016/j.conbuildmat.2020.121647> (14 pages).

Ing et al., "Set Retardation of Well Cements," ZKG, XP001597627, 2015, 9 pages.

International Search Report Issued in Corresponding Applicaiton No. PCT/US2022/025013, dated Aug. 1, 2022, 5 pages.

\* cited by examiner

*Primary Examiner* — Anthony J Green
(74) *Attorney, Agent, or Firm* — Osha Bergman Watanabe & Burton LLP

(57) ABSTRACT

A retarder mixture for oil and gas well cementing includes a lignosulfonate compound and at least one hydrolyzed carbohydrate. A method includes blending the retarder mixture and a cement precursor to form a cement precursor mixture and introducing water into the cement precursor mixture to form a cement mixture. The cement mixture is pumped down a well and cures to form a cement sheath containing the cement precursor and the retarder mixture.

20 Claims, 4 Drawing Sheets

LIGNOSULFONATE AND HYDROLYZED CARBOHYDRATE RETARDER ADDITIVE FOR CEMENT MIXTURE

BACKGROUND

Cement mixtures are used in the oil and gas industry for cementing oil and gas wells. For example, cement may be used to hold casing in place and prevent fluid migration between subsurface formations. Primary cementing includes pumping cement down a casing and into an annulus between the formation and the casing (or between casings). Secondary cementing, or remedial cementing, is performed to repair primary cementing issues. Cements used in the oil and gas industry must be able to withstand the extreme temperatures, pressures and chemical environments encountered in hydrocarbon-bearing formations.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a retarder mixture for oil and gas well cementing. The retarder mixture may include a lignosulfonate compound and at least one hydrolyzed carbohydrate, wherein the retarder mixture contains an isolated sulfur group and a methoxy group.

In another aspect, embodiments disclosed herein relate to a method including blending a retarder mixture and a cement precursor to form a cement precursor mixture, and introducing water into the cement precursor mixture to form a cement mixture, wherein the retarder mixture comprises a lignosulfonate compound and at least one hydrolyzed carbohydrate.

In yet another aspect, embodiments disclosed herein relate to a well including a borehole extending a distance into a formation, a casing extending into the borehole, and a cured cement sheath disposed between the casing and the formation, wherein the cured cement sheath contains a cement precursor and a retarder mixture containing a lignosulfonate compound and at least one hydrolyzed carbohydrate.

Other aspects and advantages of the claimed subject matter will be apparent from the following description and the appended claims.

DETAILED DESCRIPTION

Oil and gas well cementing is an important operation during drilling and completion of oil wells. The cement sheath may maintain well integrity behind the casing and provide long-term zonal isolation to ensure safety and prevent environmental problems. The cements placed in the annulus between the casing and the formations (or between multiple casings) may experience stress under wellbore conditions, especially as pressures and temperatures change or cycle with the movement of fluids and equipment.

Figure 1:
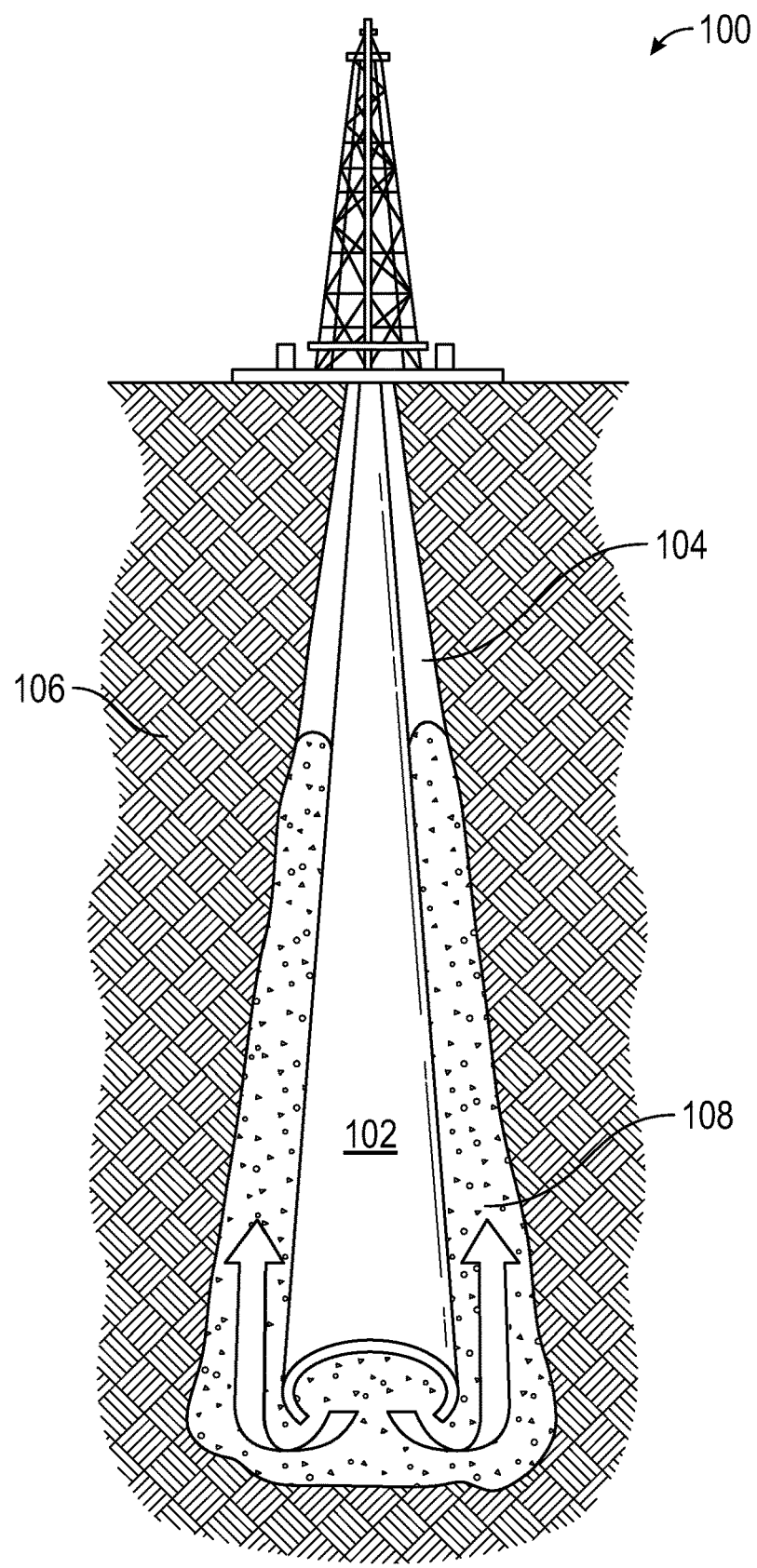
FIG. 1 illustrates formation of cement sheath in an oil and gas well in accordance with one or more embodiments.

For example, FIG. 1 shows a schematic depiction of a method 100 of cementing a formation 106. As shown, a cement mixture 108 according to embodiments disclosed herein may be pumped downhole through a casing 102. The cement mixture 108 is then pushed up into an annulus 104 formed between the formation 106 and the casing 102. The direction of cement mixture flow is indicated by arrows (not labeled). After the cement mixture 108 has been introduced into the well and pumped into the annulus 104, the cement mixture 108 may be held in place in the wellbore until it cures, such that a sheath of cured cement may be formed in the annulus 104 of the well. The cement mixture 108 may be held in the annulus 104, for example, by maintaining a pressure at the bottom of the wellbore until the cement mixture 108 cures.

A cement mixture for an oil and gas well may be designed to ensure acceptable properties, such as mix-ability, stability, rheology, fluid loss, and adequate thickening time. Different chemicals may be used when designing cement mixtures to achieve the desired properties, and may include, for example, retarders, fluid loss additives, dispersants, gas migration additives and expansion additives. In the present disclosure, the term "cement mixture" may include a cement precursor, such as Portland cement, water, and other compounds.

Some oil and gas wells may operate at elevated temperatures, such as 125° F. (52° C.) or higher. Under an elevated temperature condition, thickening of cement may occur at a faster rate when compared with a lower or ambient temperature due to increased chemical reactivity of the cement mixture. Extension of cement thickening time under elevated temperatures has conventionally been achieved by addition of cement retarders or use of commercially available retarded cements that contain compounds such as lignin, gums, and starches. However, these conventionally used retarding compounds may not be compatible with other cement additives. Additionally, the thickening time may also be difficult to consistently control when using conventional retarding compounds.

Embodiments disclosed herein generally relate to cement mixtures that include retarders for lengthening the thickening time of cement mixtures when pumping the cement mixtures downhole. As used herein, retarders refer to cement additives whose function is to retard, or delay the thickening of cement mixtures. Thickening time refers to the amount of time the cement mixture remains capable of being manipulated (e.g., amount of time the cement mixture is capable of being pumped downhole). Delaying the thickening of a cement mixture, i.e., increasing the thickening time of the cement mixture, may provide an extended amount of time to pump the cement mixture into a desired position in a well. Thickening time may be assessed under simulated well conditions, for example, using a consistometer that measures the cement mixture viscosity under predicted downhole temperature and pressure conditions. Cement mixtures according to embodiments of the present disclosure may be used in various subterranean formations for primary and secondary cementing operations.

Retarder Mixture

In one aspect, the present disclosure relates to a retarder mixture containing a lignosulfonate compound and at least one hydrolyzed carbohydrate.

In some embodiments, the retarder mixture may include a lignosulfonate compound, such as sodium lignosulfonate, in an amount ranging from about 10% to 30% by weight of the retarder mixture. For example, an amount of lignosulfonate in a retarder mixture may range from a lower limit of 10, 11, 12, 13, 14, or 15% to an upper limit of 25, 26, 27, 28, 29 or 30% by weight of the retarder mixture, where any lower limit may be paired with any upper limit. As used herein, the terms "approximately" and "about" may mean that there can be a variance in value of up to ±10%, of up to 5%, of up to 2%, of up to 1%, of up to 0.5%, of up to 0.1%, or up to 0.01%.

Figure 2:
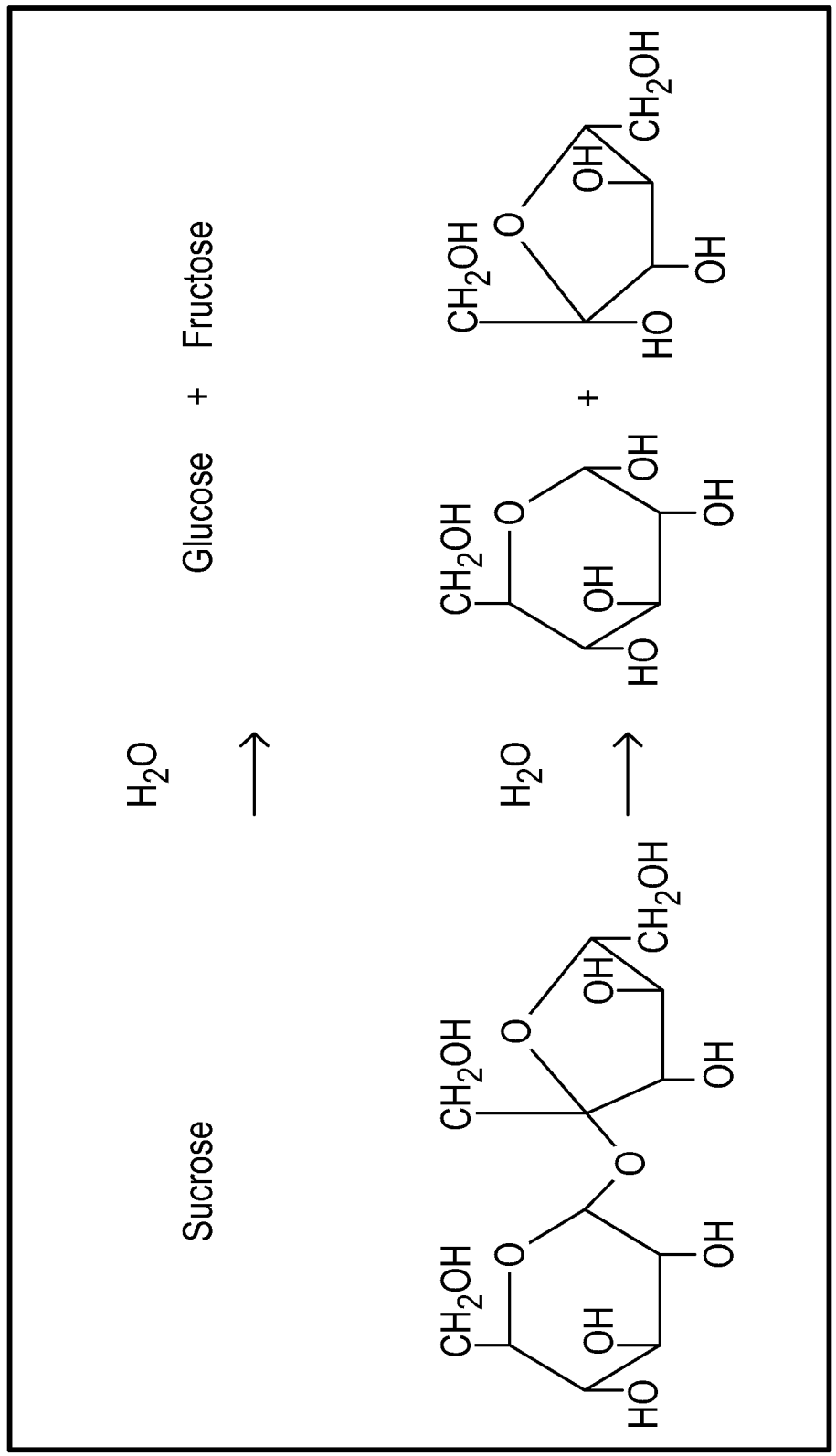
FIG. 2 illustrates a hydrolysis reaction of sucrose into glucose and fructose in accordance with one or more embodiments.

Hydrolyzed carbohydrates may include carbohydrate compounds (e.g., sugars or saccharides) formed by hydrolysis reaction. In some embodiments, the hydrolyzed carbohydrates may include glucose, fructose, galactose and xylose. In some embodiments, hydrolyzed carbohydrates may be an organic polymer. FIG. 2 shows an example of hydrolyzed carbohydrates that may be used in retarder mixtures according to embodiments of the present disclosure, where the hydrolyzed carbohydrates are formed by a hydrolysis reaction of sucrose.

In some embodiments, the retarder mixture may contain the hydrolyzed carbohydrates in an amount ranging from about 68% to 90% by weight of the retarder mixture. For example, a retarder mixture may include an amount of hydrolyzed carbohydrates ranging from a lower limit of 68, 70 or 75% by weight of the retarder mixture to an upper limit of 80, 85 or 90% by weight of the retarder mixture, where any lower limit may be paired with any upper limit.

In some embodiments, the retarder mixture may have a ratio of the amount of lignosulfonate compound to the amount of the hydrolyzed carbohydrates ranging from about 0.1 to 0.45, such as a lower limit from 0.1, 0.11 or 0.15 to an upper limit from 0.4, 0.43, or 0.45, where any lower limit may be paired with any upper limit.

A retarder mixture may optionally include other additives such as fluid loss additives, dispersants, solvents, gas migration additives and expansion additives. For example, in some embodiments, a retarder mixture may include a sodium lignosulfonate powder, an organic polymer that is a hydrolyzed carbohydrate, and one or more additives, such as formaldehyde and methanol.

Figure 3:
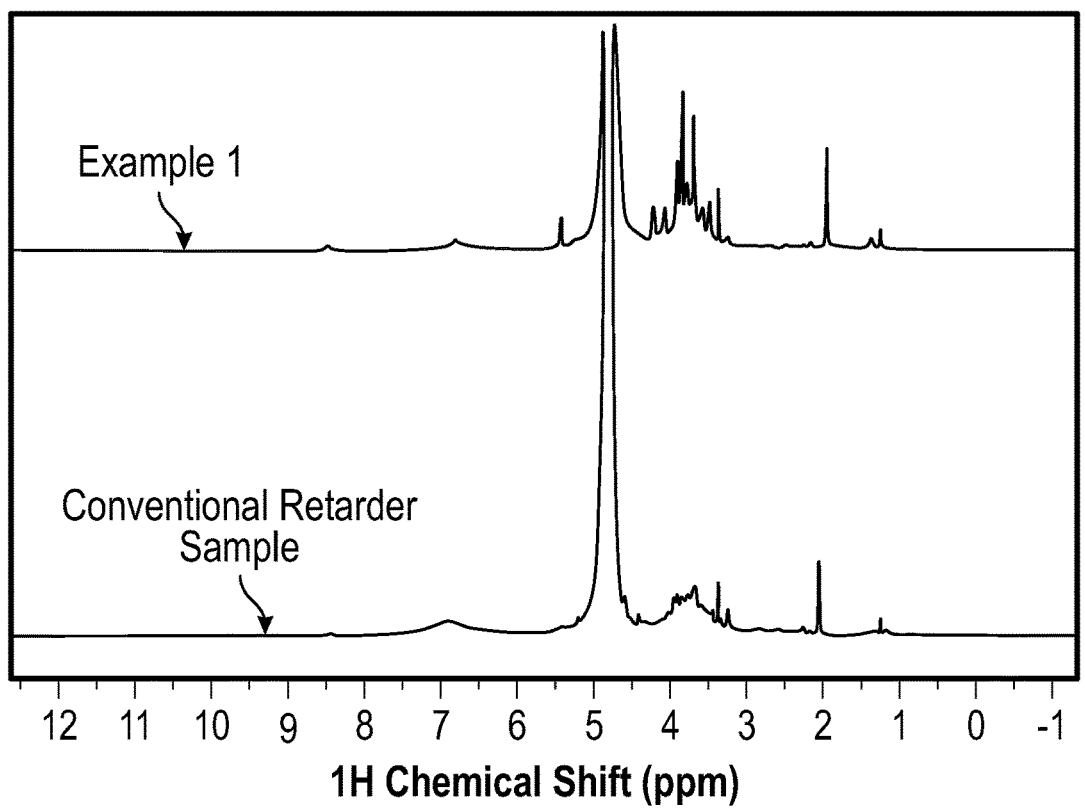
FIG. 3 shows the $^1$HNMR spectra of the retarder mixture from EXAMPLE 1 and a conventional retarder sample.

In some embodiments, a retarder mixture may contain an isolated sulfur group and a methoxy group. Isolated sulfur groups may be any functional group that includes one or more sulfur atoms and may include, for example, sulfur groups such as —$SO_3H$, mercaptan (Thiol) RSH, sulfide (Thioether) RSR', disulfide RSSR', and sulfoxide RSOR', where R and R' represents any molecular structure. Methoxy groups may be represented by, for example, a methyl group bound to oxygen, or —$OCH_3$. The presence of isolated sulfur and methoxy group may be detected, for example, by obtaining proton nuclear magnetic resonance ($^1H$ NMR) spectra of a retarder mixture sample. The peaks in a range from 3 to 4 ppm on the $^1H$ NMR spectra represent isolated sulfur and methoxy groups, which may indicate that a lignosulfonate compound is present in the retarder mixture. For example, FIG. 3 shows $^1H$ NMR spectra of a retarder mixture according to embodiments of the present disclosure (labeled EXAMPLE 1), and a conventional retarder sample. Pronounced peaks between 3 and 4 ppm are seen in the spectrum of the retarder mixture according to embodiments of the present disclosure, which contains sodium lignosulfonate.

In some embodiments, a retarder mixture may contain unsaturated compounds. Unsaturated compounds refer to an organic compound containing carbon atoms connected by double or triple bonds, including aromatic groups. Unsaturated compounds may be detected by using $^1H$ NMR analysis. For example, the peaks between 4 to 6 ppm may represent double bonds of carbon atoms, while the peaks between 7 to 8 ppm may represent aromatic groups.

In some embodiments, a retarder mixture may have a specific gravity that ranges from a lower limit from 1.15, 1.16, 1.17, 1.18 1.19 or 1.20 to an upper limit from 1.45, 1.46, 1.47, 1.48, 1.49 or 1.50 at 20° C., where any lower limit may be paired with any upper limit.

Retarder mixtures or cement mixtures including retarder mixtures of the present disclosure may include an amount of alkali metal elements (e.g., lithium, sodium, potassium, rubidium, cesium, and francium), which may be referred to as the alkali content. According to embodiments of the present disclosure, the alkali content in a retarder mixture may be quantified in terms of its alkali equivalent, $Na_2O$ equivalent (or $Na_2Oeq$). The $Na_2O$ equivalent is the mass percentage of $Na_2O$ that produces the same amount of moles of alkali as the sum of potassium and sodium oxides in the mixture. In some embodiments, the retarder mixture may have an alkali content that ranges from a lower limit selected from 0 g, 0.5 g, and 1.0 g of $Na_2O$ equivalent per liter of the retarder mixture to an upper limit of 3.5 g, 4.0 g, and 4.5 g of $Na_2O$ equivalent per liter of the retarder mixture, where any lower limit may be paired with any upper limit.

In some embodiments, the retarder mixture may have a weight loss of that ranges from about 0% to about 50%, when the retarder mixture is heated from 0° C. to 400° C., as measured using thermogravimetric analysis (TGA). For example, retarder mixtures according to embodiments of the present disclosure may have weight loss when heated from 0° C. to 400° C. ranging from a lower limit of 0%, 5%, or 10% to an upper limit of 40%, 45% or 50%, where any lower limit may be paired with any upper limit.

Cement Mixture

In one aspect, embodiments include a cement mixture that contains a retarder mixture as described herein, cement precursor, and water. Cement precursors may be any suitable material that when mixed with water can be cured into a cement.

Cement precursors may be hydraulic or non-hydraulic. Hydraulic cement precursors are materials that refer to a mixture of limestone, clay and gypsum burned together under extreme temperatures. A non-hydraulic cement precursor material refers to a mixture of lime, gypsum, plasters and oxychloride. A non-hydraulic cement precursor may take longer to harden or may require drying conditions for proper strengthening when compared with hydraulic cement precursors, but often is more economically feasible. A hydraulic or non-hydraulic cement precursor may be chosen based on the desired application of the cement mixture of the present disclosure.

In some embodiments, a cement precursor may be a Portland cement precursor, such as Ordinary Portland Cement (OPC), Class A Portland Cement, Class B Portland Cement, Class C Portland Cement, Class G Portland Cement or Class H Portland Cement. Portland cement precursor is a hydraulic cement precursor (cement precursor material that may harden by reacting with water and form a water-resistant product) produced by pulverizing clinkers, which contain hydraulic calcium silicates and one or more of the forms of calcium sulfate as an inter-ground addition. In other embodiments, the cement precursor material may be a Saudi cement precursor, which is a combination of Portland cement precursor and crystalline silica. Crystalline silica is also known as quartz.

In some embodiments, a cement precursor may include additional materials. Cement precursor material may include, but is not limited to, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaOAl_2O_3.Fe_2O_3$), gypsum ($CaO_4$ $2H_2O$), sodium oxide, potassium oxide, limestone, lime (calcium oxide), hexavalent chromium, calcium aluminate, silica sand, silica flour, hematite, manganese tetroxide, siliceous fly ash, calcareous fly ash, slag cement, silica fume, quartz, any known cement precursor material or combinations of any of these. Silica flour is a finely ground crystalline silica with a molecular formula of $SiO_2$ and may have a grain size ranging from about 1 to about 500 microns, such as from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, and from 80 to 100 microns.

Water used in cement mixtures of the present disclosure may include one or more known compositions of water, including distilled; condensed; filtered or unfiltered fresh surface or subterranean waters, such as water sourced from lakes, rivers or aquifers; mineral waters; gray water; run-off, storm or waste water; potable or non-potable waters; brackish waters; synthetic or natural sea waters; synthetic or natural brines; formation waters; production water; and combinations thereof. Cement mixtures may contain water in an amount sufficient to cure the cement precursor. In some embodiments, a cement mixture may contain a ratio of cement precursor to water ranging from about 80 to 20 to about 40 to 60. For example, a cement mixture may have a ratio of cement precursor to water of 80 to 20, 75 to 25, 70 to 30, 65 to 35, 60 to 40, 55 to 45, 50 to 50, 45 to 55, or 40 to 60.

A cement mixture may include a retarder mixture according to embodiments of the present disclosure in an amount from about 0.2 liters (L)/100 kg of cement mixture to 0.6 L/100 kg of cement mixture. For example, a cement mixture may include an amount of a retarder mixture ranging from a lower limit selected from 0.2, 0.25, or 0.3 L/100 kg of cement mixture to an upper limit of 0.5, 0.55, or 0.6 L/100 kg of cement mixture, where any lower limit may be paired with any upper limit.

In some embodiments, a cement mixture may optionally include additives such as suspending agents, cement accelerators, cement extenders, weighting agents, fluid loss agents, lost circulation materials, fluid loss additives, dispersants, gas migration additives, defoamer, suspending agent and expansion additives, solvents, and combinations thereof. Suspending agents may be hydrophilic polymers, such as hydroxyethyl cellulose (HEC), polyhydroxylated polyacrylamide (PHPA), or acrylic and acrylamide-based polymers. Cement accelerators may include, for example, calcium chloride, sodium chloride, sodium metasilicate, potassium chloride, gypsum, and combinations thereof. Cement extenders may include, for example, bentonite, sodium silicate, volcanic ash, diatomaceous earth, perlite, and combinations thereof. Weighting agents may include, for example, hematite, ilmenite, barite, and combinations thereof. Fluid loss additives may include, for example, polymer additives such as cellulose, polyvinyl alcohol, polyalkanolamines, polyacrylamides, liquid latex, and combinations thereof. Loss circulation materials may include, for example, ground coal, ground gilsonite, ground walnut hull, and combinations thereof.

In some embodiments, the cement mixture may include a suspending agent. Suspending agents are compounds that may increase the viscosity of the cement mixture and aid in suspending cement particles in water. Suspending agents may be hydrophilic polymers, such as hydroxyethyl cellulose (HEC), polyhydroxylated polyacrylamide (PHPA), or acrylic and acrylamide-based polymers.

In some embodiments, the cement mixture may include a suspending agent in an amount sufficient to suspend cement particles in the mixture and achieve a desired viscosity and uniform density. For example, if too much suspending agent is used, the cement mixture will be too viscous for pumping into a formation. If too little suspending agent is used, cement particles may not be effectively suspended in the cement mixture, and some cement particles may begin to settle during the curing process, resulting in a non-uniform density in the cement. In some embodiments, a cement mixture may contain from about 0.1 to about 3.0 wt. % (weight percent) of suspending agent by weight of cement precursor (BWOC). For example, a cement mixture may have an amount of suspending agent ranging from a lower limit of 0.1, 0.25, 0.4, 0.5, 1.0 wt. % BWOC, and an upper limit of 3.0, 2.5, 2.0, or 1.5 wt. % BWOC, where any lower limit may be used in combination with any upper limit.

In some embodiments, a cement mixture may optionally include aggregates. Such cement mixtures may be referred to as "concrete" or "concrete mixtures." In the present disclosure, aggregates may include, but not limited to, sand, stone, gravel, crushed stone, slag, recycled concrete, geosynthetic aggregates, or any other particulate materials used with the cement to produce concrete. Aggregate particulates may be fine, medium, course, or any other sizes. Grades and properties of aggregates typically used in commercial applications are standardized and may be found in various industrial standards such as Indian Standard (IS) 383.

A cement mixture may have any suitable viscosity for use in cementing formations. For example, a cement mixture may be designed to have a viscosity that allows the cement mixture to be pumped through downhole tubing and back up between an annulus formed between a well casing and a formation. In some embodiments, the cement mixture may have a plastic viscosity in a range of from about 40 to about 100 cP (centipoise) at a temperature in a range of from about 70° F. (21° C.) to about 180° F. (82° C.). For example, cement mixture viscosities may range from a lower limit of 40, 50, 60, or 70 cP to an upper limit of 80, 90, or 100 cP, where any lower limit may be used in combination with any upper limit.

In some embodiments, a cement mixture may have a yield point in a range of from about 75 to about 125 lbf/100 ft$^2$ (pounds of force per 100 square feet) at a temperature in a range of from about 70° F. (21° C.) to about 180° F. (82° C.). For example, a cement mixture may have a yield point ranging from a lower limit of 75, 85, or 100 lbf/100 ft$^2$ to an upper limit of 125, 120, or 115 lbf/100 ft$^2$, where any lower limit may be used in combination with any upper limit. In some embodiments, cement mixtures may be homogeneous mixtures, meaning the cement precursor, retarding mixture, and water are evenly distributed throughout the cement mixture.

Cement mixtures may have any suitable slump for use in cementing formations. Slump is a measure of concrete consistency and fluidity. Slump may be determined by placing a conical-shape metal mould with specific dimensions on a flat surface, filling the metal mould with the cement mixture, removing the mould, and measuring the distance from the top of the slumped cement mixture to the level of the top of the metal mould. In some embodiments, a cement mixture may have a slump ranging from about 20 mm to about 150 mm. For example, a cement mixture may have a slump ranging from a lower limit of 20, 30, or 40 mm to an upper limit of 130, 140, or 150 mm, where any lower limit may be used in combination with any upper limit.

In some embodiments, a cement mixture may have a thickening time of about 4 hours to 20 hours, when the cement mixture is cured at 125° F. (52° C.). For example, cement mixtures according to embodiments of the present disclosure may have a thickening time ranging from 4 hours, 4.5 hours, or 5 hours to an upper limit of 19, 19.5, or 20 hours, where any lower limit may be used in combination with any upper limit.

Method of Making a Cement Mixture

In one aspect, embodiments disclosed herein relate to a method of making a cement mixture. Methods may include blending a retarder mixture disclosed herein and a cement precursor disclosed herein to form a cement precursor mixture. Optionally, additives may also be blended with the retarder mixture and the cement precursor to form a cement precursor mixture. Methods of the present disclosure may further include introducing water into the cement precursor mixture to form a cement mixture.

In other embodiments, a retarder mixture may be mixed together with a cement precursor and water at the same time to form the cement mixture. Retarder mixtures of the present disclosure may be used to modify the properties of cement mixtures used in oil and gas wells. For example, a retarder mixture of the present disclosure may lengthen the thickening time of the cement mixture.

In some embodiments, the water may be introduced at a mixing speed of about 8000 RPM (revolutions per minute). After the water has been introduced into the cement precursor or cement precursor mixture, the resultant cement mixture may be mixed for a time and at a mixing speed suitable for obtaining a homogeneous mixture. For example, mixing times may range from a lower limit of 10, 20, 30, 35, or 40 seconds to an upper limit of 60, 55, 50, or 45 seconds, where any lower limit may be used in combination with any upper limit. Mixing speeds may range from a lower limit of 500, 1,000, 2,000, 5,000, or 8,000 RPM to an upper limit of 20,000, 18,000, 15,000, or 12,000 RPM, where any lower limit may be used in combination with any upper limit. In some embodiments, a cement mixture may be mixed for about 35 seconds at about 12000 RPM.

Cured Cement

In one aspect, embodiments include a cured cement containing a retarder mixture distributed throughout the cement matrix. Cured cement may be made by mixing water with a cement precursor mixture according to embodiments of the present disclosure and waiting until the cement mixture cures due to hydration reactions with the cement precursor mixture.

For example, a cement precursor, such as Portland cement, may contain tricalcium silicate ($Ca_3SiO_5$) tricalcium aluminate ($Ca_3Al_2O_6$), dicalcium silicate ($Ca_2SiO_4$) and tetracalcium alumina ferrite ($4CaOAl_2O_3Fe_2O_3$) as major components. In some embodiments, a cement precursor may contain silicates in an amount of 75 to 80% by weight of the cement precursor, of which, 60-65% may be $Ca_3SiO_5$, and 20% or less may be $Ca_2SiO_4$, unless the precursor is designed to be retarded. $Ca_3SiO_5$ and $Ca_3Al_2O_6$ may contribute to the early strength development of the cement during curing, while $Ca_2SiO_4$ may contribute to the strength at full cure. Additionally, gypsum may be added to the cement mixture to further control the thickening time.

Upon hydration of the cement precursor, $Ca_3SiO_5$ and $Ca_2SiO_4$ react with water to produce calcium silicate hydrate (CSH) and calcium hydroxide ($Ca(OH)_2$). CSH may represent approximately 70% of fully hydrated precursor and is considered to be a principal binder of cured cement. Meanwhile, gypsum may react with $Ca_3Al_2O_6$ and water to produce a compound known as ettringite. Ettringite may further convert to calcium monosulphoaluminate hydrate.

Retarder mixtures according to embodiments of the present disclosure may be added to a cement precursor to retard hydration reactions with the cement precursor, thereby delaying thickening of the cement mixture.

Retardation of cement curing may be explained by several theories. Adsorption theory stipulates that the retarder adsorbs onto the CSH, rendering the CSH hydrophobic and consequently preventing a contact with water. According to precipitation theory, the retarder reacts with calcium or hydroxyl ions and forms an impermeable sheet which prevents the hydration reaction from occurring. Nucleation theory suggests that the retarder slows down the rate of hydration by adsorbing onto the nuclei of the compounds. Lastly, complexation theory suggests that calcium ions may chelate, or form complexes, with the retarder, preventing nuclei from forming. It may be possible that all retardation mechanisms of cement precursor provided by the above theories contribute to the actual retardation of cement curing.

In some embodiments, cured cement may have an increased compressive strength of about 15% to 40% compared to a cured cement without a retarder mixture, when the cured cement and the cured cement without the retarder mixture have a same slump and are cured for a same length of time. For example, a cured cement according to embodiments of the present disclosure may have a compressive strength that is greater than the compressive strength of a cured cement without a retarder mixture by an amount ranging from a lower limit of 15%, 17.5%, or 20% to an upper limit of 35%, 37.5%, or 40%, where any lower limit may be used in combination with any upper limit.

In some embodiments, a cured cement may have a density in a range of from about 2300 $kg/m^3$ to about 2700 $kg/m^3$. For example, a cured cement may have a density ranging from a lower limit of 2300 $kg/m^3$, 2350 $kg/m^3$, or 2400 $kg/m^3$ to an upper limit of 2600 $kg/m^3$, 2650 $kg/m^3$, or 2700 $kg/m^3$, where any lower limit may be used in combination with any upper limit.

Method of Using a Cement Mixture

In one aspect, embodiments disclosed here relate to a method of forming a cement sheath in a wellbore. Methods may include introducing a cement mixture according to embodiments of the present disclosure into a wellbore, for example, using downhole tubing. The composition of the cement mixture may include a mixture of a cement precursor, water, and a retarder mixture, as disclosed herein.

Cement mixtures according to embodiments of the present disclosure may be mixed at a surface of one or more wells and pumped into a well using one or more surface pumps. Cement mixtures may be pumped through casing or other downhole tubing to a bottom of the well (e.g., as shown in FIG. 1), at which point, the pumping may direct the cement mixture around the outside of the downhole tubing and into an annulus formed around the outside of the downhole tubing. Cement mixtures of the present disclosure may be pumped around a casing to cement the casing in a well or may be pumped to other areas of a well. In some embodiments, pressure may be applied to the cement mixture (e.g., by pumping a fluid or air) to hold the cement mixture in place until it cures. In some embodiments, one or more downhole tools or seals may be used to hold the cement mixture in place until it cures.

Cement mixtures may be cured for any suitable time under surrounding downhole temperature and pressure conditions in order to form cured cement as described herein. Cement mixtures may begin curing upon initial contact of a cement precursor mixture (including cement precursor and a retarder mixture) with water. In some embodiments, the curing times at elevated temperatures, such as 125° F. (52° C.), may be from several hours to several days. For example, curing times may range from a lower limit of 3, 4, 5, 10, 12, or 24 hours to an upper limit of 2, 3, 4, or 5 days, where any lower limit may be used in combination with any upper limit. One of ordinary skill in the art may understand that such conditions may vary due to differences in compositions of the cement mixture and downhole conditions.

Cement mixtures according to embodiments of the present disclosure may cure under formation conditions, such as temperatures in a range of from about 77° F. (25° C.) to about 500° F. (260° C.) and pressures ranging from ambient pressure to about 45,000 psi. For example, formation temperatures may range from a lower limit of 77° F. (25° C.), 86° F. (30° C.), 104° F. (40° C.), or 122° F. (50° C.), to an upper limit of 212° F. (100° C.), 302° F. (150° C.), 392° F. (200° C.), or 500° F. (260° C.), where any lower limit may be used in combination with any upper limit. Formation pressures may range from a lower limit of 15 psi, 100 psi, 1,000 psi, 3,000 psi, or 5,000 psi to an upper limit of 10,000 psi, 15,000 psi, 20,000 psi, 30,000 psi, or 45,000 psi, where any lower limit may be used in combination with any upper limit.

EXAMPLES

Example 1 Retarder Mixture Synthesis

A sodium lignosulfonate and hydrolyzed carbohydrate were mixed using a conventional mixer to produce a retarder mixture sample. The composition of the retarder mixture sample was 30 wt % sodium lignosulphonate, 68 wt % hydrolyzed carbohydrates, 1 wt % methanol, and 1 wt % formaldehyde.

The retarder mixture sample and a conventional retarder sample were analyzed by $^1$H NMR spectroscopy. The $^1$H NMR spectra are shown in FIG. 3. The spectrum of the retarder mixture of EXAMPLE 1 shows prominent peaks between the intensity of 3-4 ppm, which indicates a presence of a methoxy group (—$OCH_3$) and isolated sulfur group within the retarder mixture sample.

Figure 4:
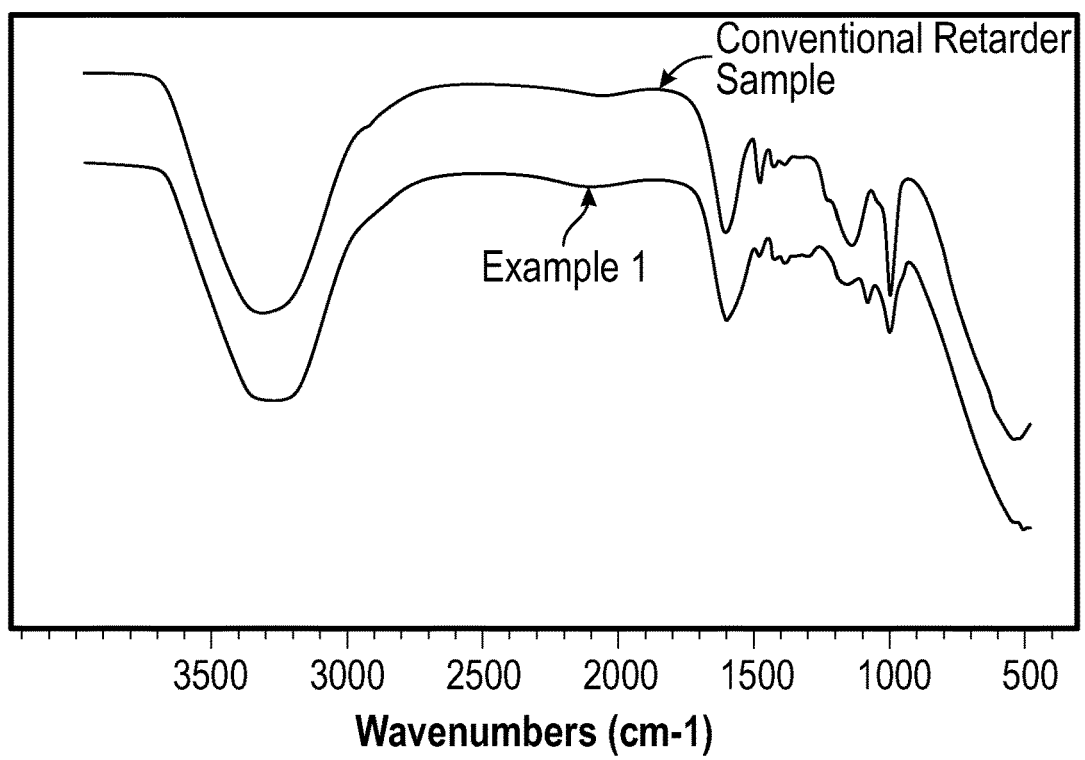
FIG. 4 shows the FTIR spectra of the retarder mixture of EXAMPLE 1 and a conventional retarder sample.

The retarder mixture sample and conventional retarder sample were also analyzed by Fourier-transform infrared spectroscopy (FTIR). The FTIR spectra are shown in FIG. 4. FTIR may be used to identify and characterize organic materials such as polymers and to a limited extent, inorganic materials, in various forms such as films, solids, powders and liquids. The application may include detection and identification of contaminants on or in a material, such as foreign particles, fibers, powders and liquids, or identification of an extracted additive from a polymer composition. The FTIR spectrum of EXAMPLE 1 in FIG. 4 shows peaks at the wavenumbers of approximately 1200 and 1300 $cm^{-1}$.

These peaks may represent double bonds of sulfur and oxygen and indicate the presence of a lignosulfonate compound. The FTIR spectrum of EXAMPLE 1 also shows a fewer number of peaks when compared to the spectrum of the conventional retarder sample, as illustrated in FIG. 4, which may be an indication that the retarder mixture sample of EXAMPLE 1 contains fewer impurities than the conventional retarder.

Figure 5:
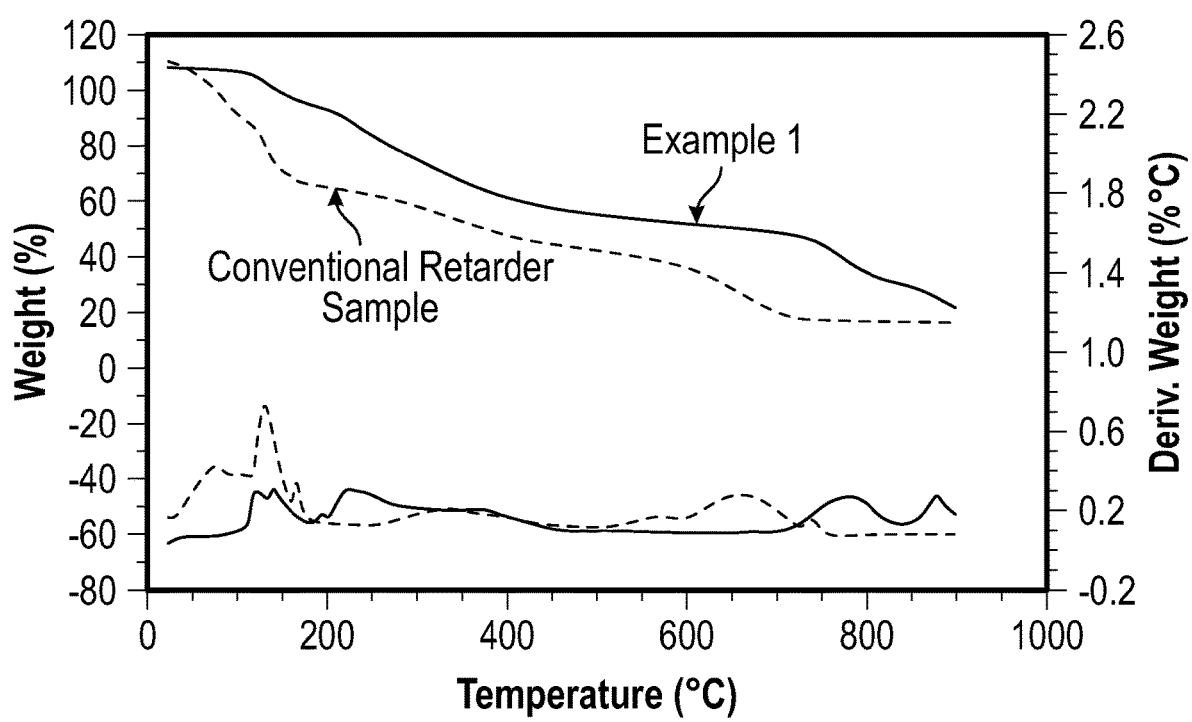
FIG. 5 is a TGA graph of the retarder mixture from EXAMPLE 1 and a conventional retarder sample.

Additionally, weight loss of the retarder mixture sample of EXAMPLE 1 and the conventional retarder sample at elevated temperatures was studied by conducting a thermogravimetric analysis (TGA). During the TGA analysis, the samples were heated from 0 to 1652° F. (900° C.) and percentage weight loss was measured, as illustrated in FIG. 5. FIG. 5 shows that the weight loss of the retarder mixture sample of EXAMPLE 1 was approximately 60% at 752° F. (400° C.), while the weight loss of the conventional retarder sample was 50% at 752° F. (400° C.), demonstrating the suitability of the retarder mixture sample of EXAMPLE 1 in elevated temperature conditions such as the downhole environment of an oil and gas well.

Example 2

A cement mixture was prepared by mixing the retarder mixture sample of EXAMPLE 1, cement precursor, and water. The composition is shown in Table 1, below. First, the cement mixture was prepared by adding a cement precursor, 410 kg/m$^3$ Ordinary Portland Cement (OPC), and the retarder mixture of EXAMPLE 1 to a container and manually mixing. Water was then added to the cement precursor mixture and mixed further. The resultant cement mixture was poured into a one-inch diameter cylinder and cured in a pressurized curing chamber. The temperature and pressure inside of the curing chamber was increased from room temperature and 0 psi to simulated bottomhole conditions, including a bottomhole circulating temperature (BHCT) of 125° F. (52° C.) and bottomhole pressure of 5200 psi, over 30 minutes. The curing chamber conditions were then held steady at the simulated bottomhole conditions until the cement mixture cure and the test was completed. The cement mixture was considered cured and the thickening time was obtained when the consistency of the cement mixture reached 100 Bc (Bearden consistency units). Consistency of the cement mixture may be measured, for example, using a consistometer to measure resistance to the mixing paddle turning as the cement mixture sets.

Comparative Example 1

A cement mixture was prepared as described in EXAMPLE 2, except EXAMPLE 1 retarder mixture was not added to the cement mixture and a few drops of defoamer was added instead. The composition is shown in Table 1.

TABLE 1

| Sample | OPC (g) | Water (g) | EXAMPLE 1 (g) | Defoamer (g) |
|---|---|---|---|---|
| EXAMPLE 2 | 800 | 345.85 | 8.72 | NA |
| COMPARATIVE EXAMPLE 1 | 800 | 355.04 | NA | Few drops |

Table 2 shows the thickening time of the cement mixtures of EXAMPLE 2 and COMPARATIVE EXAMPLE 1. The results indicate that the cement mixture of EXAMPLE 2, which contains the retarder mixture of EXAMPLE 1, had a thickening time greater than 4 hours. The cement mixture of EXAMPLE 2 had not reached the consistency of 100 Bc at 4 hours, at which point the experiment was stopped. On the contrary, the cement mixture of COMPARATIVE EXAMPLE 1, which did not contain the retarder mixture, had a thickening time of 1 hour and 45 minutes. This demonstrates an improvement in the thickening time of cement mixtures by the addition of the embodiment retarder mixture.

TABLE 2

| Sample | Thickening time (hours) |
|---|---|
| EXAMPLE 2 | Over 4 |
| COMPARATIVE EXAMPLE 1 | 1.75 |

Example 3

A cement mixture was prepared by mixing the retarder mixture of EXAMPLE 1, cement precursor (410 kg/m$^3$ Ordinary Portland Cement), sand (Zone 2 sand IS-383), course aggregate (20-5 mm, IS-383), and water. The composition is shown in Table 3, below.

Example 4

A cement mixture was prepared as described in EXAMPLE 3, except the water to cement (W/C) ratio was increased to 0.44 from 0.48. The composition is shown in Table 3, below.

Comparative Example 2

A cement mixture was prepared as described in EXAMPLE 3, except the retarder mixture of EXAMPLE 1 was not added. The composition is shown in Table 3.

TABLE 3

| | Cement (410 kg/m$^3$ OPC) | Zone 2 Sand (IS 383) | Course Aggregate (20-5 mm, IS-383) | W/C ratio | EXAMPLE 1 (Liter/50 kg cement) |
|---|---|---|---|---|---|
| EXAMPLE 3 | 100 | 34 | 66 | 0.48 | 0.15 |
| EXAMPLE 4 | 100 | 34 | 66 | 0.44 | 0.15 |
| COMPARATIVE EXAMPLE 2 | 100 | 34 | 66 | 0.48 | 0 |

A slump test was conducted for each of the cement mixtures of EXAMPLE 3, EXAMPLE 4, and COMPARATIVE EXAMPLE 2 to measure the consistency and workability of cement mixtures. The slump tests were conducted by placing a slump cone, with a bottom diameter of 8 inches, a top diameter of 4 inches and a height of 12 inches, on a flat, non-absorbent surface and filling the slump cone with a cement mixture to the top of the slump cone. The slump cone was lifted vertically, and the cement mixture was allowed to subside. The distance from the top of the slumped cement mixture to the level of the top of the slump cone was measured to determine the slump of each cement mixture.

Table 4 shows the slump test results of the cement mixtures of EXAMPLES 3-4 and COMPARATIVE EXAMPLE 2. The slump test results of the cement mixtures of EXAMPLE 3 and COMPARATIVE EXAMPLE 2 show that the cement mixture of EXAMPLE 3, which contained 0.15 Liter/50 kg of the EXAMPLE 1 retarder mixture, had a substantially greater slump value than the cement mixture of COMPARATIVE EXAMPLE 2, which had the same W/C ratio as EXAMPLE 3 but did not contain the retarder mixture. Further, the cement mixture of EXAMPLE 4, which is a cement mixture with a retarder mixture and a lower W/C ratio than the cement mixture of COMPARATIVE EXAMPLE 2, had the same slump value as COMPARATIVE EXAMPLE 2. A lower W/C ratio typically reduces the slump value due to a reduced water content. Therefore, the results of the slump tests illustrate that addition of a retarder mixture according to embodiments of the present disclosure improves the workability of the cement mixture despite a reduced water content.

Additionally, as shown in Table 4, the slump values of the cement mixtures of EXAMPLE 4 and COMPARATIVE EXAMPLE 2 were identical, indicating that the workability of the EXAMPLE 4 cement mixture remained the same as the cement mixture of COMPARATIVE EXAMPLE 2 even though the W/C ratio had been reduced. Therefore, addition of a retarder mixture according to embodiments of the present disclosure to the cement mixture may allow the W/C ratio to be reduced and consequently, improve the compressive strength without negatively affecting the workability of the cement mixture.

TABLE 4

| | Slump (mm) | Compressive Strength — 3 days (N/mm$^2$) | Compressive Strength — 7 days (N/mm$^2$) | Compressive Strength — 28 days (N/mm$^2$) | Density (kg/m3) |
|---|---|---|---|---|---|
| EXAMPLE 3 | 100 | 24.5 | 31.6 | 43.3 | 2390 |
| EXAMPLE 4 | 40 | 27.5 | 36.7 | 48.9 | 2400 |
| COMPARATIVE EXAMPLE 2 | 40 | 22.7 | 27.5 | 38.7 | 2395 |

Table 4 also shows results from a compressive test conducted on samples of cured cement mixtures of EXAMPLES 3-4 and COMPARATIVE EXAMPLE 2. The compressive tests were conducted by placing a cured sample of the cement mixtures of EXAMPLES 3-4 and COMPARATIVE EXAMPLE 2 in a tensile machine. A compressive test fixture was used to place the samples under compressive force until failure. The maximum compressive load was recorded, and the compressive strength was calculated by diving the maximum compressive load by the cross-sectional area of the sample.

The cement mixtures were cured for 3 days, 7 days and 28 days prior to conducting the compressive test. In order to show the effect of the retarder mixture on the compressive strength of the cured cement mixture, a percent increase of the compressive strength (CS) of the samples of EXAMPLES 3 and 4 cured for 3 days was determined by subtracting the compressive strength of the sample of COMPARATIVE EXAMPLE 2 cured for 3 days from the compressive strength of the samples of EXAMPLE 3 and EXAMPLE 4 cured for 3 days, divided by the compressive strength of the sample of COMPARATIVE EXAMPLE 2 cured for 3 days and then multiplied by 100, as shown in Equation 1.

$$\% \text{ increase } CS = 100 \times \frac{CS \text{ of sample with retarder} - CS \text{ of sample no retarder}}{CS \text{ of sample no retarder}} \quad \text{Eq. 1}$$

The same calculation method was used to determine the percent increase of the compressive strength of the samples of EXAMPLES 3 and 4 cured for 7 days and cured for 28 days. The results are shown in Table 5. A percent increase ranging from 7.9 to 11.9% was observed for the cement mixture of EXAMPLE 3, which had the same W/C ratio as the cement mixture of COMPARATIVE EXAMPLE 2, demonstrating that addition of a retarder mixture according to embodiments of the present disclosure to the cement mix may improve the compressive strength of the cured cement mixture regardless of the length of the cure time. Further increase in compressive strength was observed for the cement mixture of EXAMPLE 4, which had a lower W/C ratio than the cement mixture of COMPARATIVE EXAMPLE 2. Additional increase in the compressive strength may be a result of the reduced W/C ratio.

TABLE 5

| | % increase in compressive strength (%) | | |
| --- | --- | --- | --- |
| | 3 days | 7 days | 28 days |
| EXAMPLE 3 | 7.9 | 14.9 | 11.9 |
| EXAMPLE 4 | 21.1 | 33.5 | 26.4 |

Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims.

What is claimed is:

1. A retarder mixture for oil and gas well cementing, the retarder mixture comprising:
    a lignosulfonate compound; and
    at least one hydrolyzed carbohydrate,
    wherein the retarder mixture contains an isolated sulfur group and a methoxy group.
2. The retarder mixture of claim 1, wherein the lignosulfonate compound is sodium lignosulfonate.
3. The retarder mixture of claim 1, wherein the at least one hydrolyzed carbohydrate is selected from the group consisting of glucose, fructose, galactose, and xylose.
4. The retarder mixture of claim 1, wherein retarder mixture comprises the lignosulfonate compound in an amount ranging from 10% to 30% based on weight.
5. The retarder mixture of claim 1, wherein retarder mixture comprises the at least one hydrolyzed carbohydrate in an amount ranging from 68% to 90% based on weight.
6. The retarder mixture of claim 1, wherein a ratio of the lignosulfonate compound to the at least one hydrolyzed carbohydrate ranges from 0.1 to 0.45.
7. The retarder mixture of claim 1, having an alkali content ranging from 0 g to 4.5 g of $Na_2O$ equivalent/liter of the retarder mixture.
8. The retarder mixture of claim 1, wherein the retarder mixture comprises unsaturated compounds.
9. The retarder mixture of claim 1, wherein the retarder mixture has a weight loss of less than 50% when heated from 0° C. to 400° C.
10. A cement mixture comprising:
    a cement precursor;
    the retarder mixture of claim 1; and
    water.
11. The cement mixture of claim 10, wherein the cement mixture has an amount of the retarder mixture ranging from 0.2 liters to 0.6 liters per 100 kg the cement mixture.
12. The cement mixture of claim 10, wherein the cement mixture has a thickening time ranging from 4 hours to 20 hours at 52° C.
13. The cement mixture of claim 10 having a slump ranging from 20 mm to 150 mm.
14. A method, comprising:
    blending a retarder mixture and a cement precursor to form a cement precursor mixture;
        wherein the retarder mixture comprises a lignosulfonate compound and at least one hydrolyzed carbohydrate;
    introducing water into the cement precursor mixture to form a cement mixture,
    wherein the retarder mixture contains an isolated sulfur group and a methoxy group.
15. The method of claim 14, wherein the lignosulfonate compound is sodium lignosulfonate.
16. The method of claim 14, wherein the at least one hydrolyzed carbohydrate is selected from glucose, fructose, galactose, and xylose.
17. The method of claim 14, further comprising introducing the cement mixture into a wellbore to a downhole location having temperatures of at least 125° C.
18. The method of claim 17, further comprising applying and maintaining a pressure on the cement mixture until the cement mixture cures to form a cement sheath.
19. A well, comprising:
    a borehole extending a distance into a formation;
    a casing extending into the borehole; and
    a cured cement sheath disposed between the casing and the formation, wherein the cured cement sheath comprises:
        a cement precursor; and
        a retarder mixture comprising a lignosulfonate compound and at least one hydrolyzed carbohydrate,
        wherein the retarder mixture contains an isolated sulfur group and a methoxy group.
20. The well of claim 19, wherein the cured cement sheath is formed in an area of the formation having a temperature of greater than 125° C.

* * * * *